US 7,000,245 B1

(12) United States Patent
Pierre et al.

(10) Patent No.: US 7,000,245 B1
(45) Date of Patent: Feb. 14, 2006

(54) SYSTEM AND METHOD FOR RECORDING PUSHED DATA

(75) Inventors: Ludovic Pierre, Tokyo (JP); Vincent Dureau, Palo Alto, CA (US); Alain Delpuch, Les Essarts (FR)

(73) Assignee: OpenTV, Inc., San Francisco, CA (US)

( * ) Notice: Subject to any disclaimer, the term of this patent is extended or adjusted under 35 U.S.C. 154(b) by 1003 days.

(21) Appl. No.: 09/662,949

(22) Filed: Sep. 15, 2000

Related U.S. Application Data

(60) Provisional application No. 60/162,490, filed on Oct. 29, 1999.

(51) Int. Cl.
*H04N 7/16* (2006.01)
*H04N 7/00* (2006.01)
*H04N 7/06* (2006.01)
*H04N 5/445* (2006.01)

(52) U.S. Cl. .................... 725/136; 725/135; 725/110; 725/139; 725/151; 386/46; 386/111; 348/563; 348/564

(58) Field of Classification Search ........ 725/135–136, 725/109–110, 112, 139–142, 151–153, 100–101, 725/131–133; 386/46, 111, 112, 125, 126; 348/563–564, 157
See application file for complete search history.

(56) References Cited

U.S. PATENT DOCUMENTS

| 5,333,135 A | * | 7/1994 | Wendorf ................. 370/94.1 |
| 5,539,920 A | * | 7/1996 | Menand et al. ........... 725/151 |
| 5,797,001 A | * | 8/1998 | Augenbraun et al. ...... 395/609 |
| 5,903,816 A | * | 5/1999 | Broadwin et al. .......... 455/3.1 |
| 5,926,205 A | * | 7/1999 | Krause et al. .............. 348/7 |
| 5,926,821 A | * | 7/1999 | Hirose et al. ............. 707/202 |
| 5,956,088 A | * | 9/1999 | Shen et al. ............... 348/385 |
| 5,996,089 A | * | 11/1999 | Mann et al. ............... 714/6 |
| 6,029,045 A | * | 2/2000 | Picco et al. ............... 725/34 |

(Continued)

FOREIGN PATENT DOCUMENTS

EP  0 913 974  5/1999

(Continued)

OTHER PUBLICATIONS

International Search Report, application No. PCT/US 00/40909, mailed Feb. 14, 2001.

*Primary Examiner*—Chris Grant
*Assistant Examiner*—Son P. Huynh
(74) *Attorney, Agent, or Firm*—Meyertons Hood Kivlin Kowert & Goetzel, P.C.; Rory D. Rankin

(57) ABSTRACT

A method for recording pushed interactive data streams of a program. A pushed data stream is broadcast to a receiving station. The data stream includes one or more data objects. The data stream may also reference to live data objects which are intended for immediate consumption and become obsolete thereafter. The data stream may include a file table and object properties corresponding to the data objects. When the data stream is received by the receiving station, the individual data objects are extracted from the data stream. The data objects, accompanying object properties and the file table are then stored on a storage device. Data objects which are external to the data stream or to the program (e.g., data objects from other carousels) are retrieved and are also stored. Live data objects are not stored, but references to these data objects are stored, so that when the program is replayed, current versions of the referenced live data objects can be used. A program not being recorded may contain data objects which are flagged to be cached which are recorded automatically. Consequently, other programs may subsequently access them from the recording when they are played.

22 Claims, 8 Drawing Sheets

U.S. PATENT DOCUMENTS

| | | | |
|---|---|---|---|
| 6,177,930 B1 * | 1/2001 | Chernock et al. | 345/327 |
| 6,177,931 B1 * | 1/2001 | Alexander et al. | 725/52 |
| 6,317,885 B1 * | 11/2001 | Fries | 725/109 |
| 6,415,438 B1 * | 7/2002 | Blackketter et al. | 725/136 |
| 6,427,238 B1 * | 7/2002 | Goodman et al. | 725/136 |
| 6,442,538 B1 * | 8/2002 | Nojima | 707/1 |
| 6,502,139 B1 * | 12/2002 | Birk et al. | 709/233 |
| 6,536,041 B1 * | 3/2003 | Knudson et al. | 725/39 |
| 6,574,795 B1 * | 6/2003 | Carr | 725/71 |
| 6,637,032 B1 * | 10/2003 | Feinleib | 725/110 |
| 6,718,551 B1 * | 4/2004 | Swix et al. | 725/32 |
| 2003/0149988 A1 * | 8/2003 | Ellis et al. | 725/87 |

FOREIGN PATENT DOCUMENTS

| | | | |
|---|---|---|---|
| EP | 0 949 816 | 10/1999 | |
| WO | 98/36559 | 8/1998 | |
| WO | WO 98/53611 | * 11/1998 | 7/173 |

* cited by examiner

SYSTEM AND METHOD FOR RECORDING PUSHED DATA

CROSS REFERENCE TO RELATED APPLICATIONS

This application claims benefit of priority to Provisional Application Ser. No. 60/162,490 filed Oct. 29, 1999.

BACKGROUND OF THE INVENTION

1. Field of the Invention

The invention relates generally to broadcast television systems and more particularly to a system and method for recording pushed data content broadcast in an interactive television system.

2. Description of Related Art

Interactive television systems provide a means to deliver interactive content as well as ordinary television audio and video to a large number of subscribers. Programs broadcast by these systems may incorporate television audio and video, still images, text, interactive graphics and applications, and many other components. The interactive content of the interactive television signal may therefore include application code, data associated with the audio and video, control signals, raw data and many other types of information. Both the interactive content and the audio and video data are delivered to subscribers as "pushed" data. That is, the data is delivered to each of the subscribers, regardless of whether or not the subscribers requested the data.

Interactive content such as application code or information relating to television programs is usually broadcast in a repeating format. In other words, each piece of information is broadcast a first time, then each is transmitted a second time, and so on. The cycle is repeated so that each piece of interactive data is transmitted, for example, every ten seconds. The pieces of information which are broadcast in this manner form what is referred to as a "carousel." The sequence of information that makes up the carousel can be prepared in advance, or it can be determined "on the fly." In one embodiment, a carousel refers to a bundle of data objects coming from a single data producer source. It should be noted that the content of a particular carousel may change over time. For example, changes in carousel content may be due to updates by a data producer source. Frequently, a single carousel is transported as a contiguous data stream. However, it is also possible to multiplex two or more carousels in a single data stream.

Broadcast systems (e.g., interactive television systems) transmit information in a carousel format in order to allow receivers in the system to selectively obtain particular pieces of information in the carousel without requiring a return path from the receivers to the server. If a particular receiver needs a particular piece of information, it can simply wait until next time that piece of information is broadcast, and then extract the information from the broadcast data stream. (If the information were not cyclically broadcast, the receiver would have to transmit a request for the information to the server, thus requiring a return path.) Other receivers in the system can operate in the same manner, each receiver waiting for the information it needs, and then using only that information. By employing carousels to broadcast information, the system eliminates the need to connect each of the receivers with the server and further eliminates the need for the server to process individual requests for information. Generally, a broadcast signal may include a number of programs which in turn may include a number of audio/video streams and/or data streams. Data streams may be used to carry data such as interactive application data, subtitle information, or other data.

The pieces of information, or data objects, in a carousel may be intended to be combined in a single object data stream to form a program. This program may also contain streaming data such as audio or video. For example, an interactive television game show may combine television audio and video with interactive content such as application code which allows users to answer questions. Another example would be a news program which combines audio and video with application code that inserts current stock prices in a banner at the bottom of the screen. (It should be noted that many types of programs are possible, and it is not necessary to include either audio, video or interactive content any particular program. A program might contain only audio and interactive data (e.g., an interactive radio program,) or it might contain only interactive data (e.g., an interactive weather program that does not contain audio or video streams.) Typically, each program is associated with a corresponding channel and, when a channel containing a particular program is selected by the interactive television receiver, the data which is being broadcast on that channel is downloaded and the program is started.

The programs broadcast by the interactive television system may include components (data objects) that reference and interact with each other in a manner similar to that of DVD programs or SMIL pages. DVD programs may, for example, access different data objects which allow customized playback of a program. The program may be customized to use specific languages, to skip certain portions of the program (e.g., skipping scenes of video based on parental controls,) to display specific menus, etc. SMIL is a markup language that allows different multimedia objects to be integrated into a single presentation. SMIL pages may reference objects in data streams, manipulate these objects, synchronize data streams, etc.

Program content received in a broadcast system is normally intended to be consumed immediately. It is nevertheless possible to record this content for later playback. However the recording of the broadcast information is generally limited to recording that portion of the pushed data stream that was intended to be consumed immediately. While the received information may be re-formatted or re-packetized, it is stored just as it is received—as a stream of data. Because the program may consist of data objects that interact with each other, recording the program as a stream of data may have a number of disadvantages. For example, if the program references "live" data such as stock quotes, this data will be obsolete when the program is replayed. Further, if the program data stream is recorded as is, it may be difficult or even impossible to maintain the synchronicity and interactivity between the different components of the program.

SUMMARY OF THE INVENTION

One or more of the problems outlined above may be solved by various embodiments of the invention. One embodiment comprises an interactive television receiver which is coupled to a storage device. The receiver is coupled to a broadcast network and configured to receive a signal containing a program. The signal contains pushed interactive television application data. The receiver is configured to parse the pushed data into the separate data objects which make up the data stream of the program and to store the data objects on the storage device. The data objects may be stored with object properties such as temporal validity ranges, identifiers, version numbers and the like. Data objects which comprise live data (i.e., data that is obsolete if not immediately consumed) may be stored simply as references to the data. The receiver may be configured to detect references to data objects which are not transmitted in the same carousel as the program (e.g., references to data objects which are transmitted in the carousel of another program) and to obtain and store these data objects.

One embodiment comprises an interactive television system having a broadcast station as well as a receiver as described above. The broadcast station may be configured to transmit data corresponding to a program which is intended to be stored and played back. This data includes information which is useful in the recording and playback of the program. Typically, the information is not transmitted with programs which are intended for immediate consumption. The transmitted data may comprise a file table or directory that identifies the data objects which form the program. The file table can be used by the receiver to parse and store the data objects, as well as being used to retrieve the data objects when the program is replayed. The additional information provided by the broadcast station may also comprise object properties corresponding to the data objects. These object properties may include version numbers, references to other data objects and similar information associated with the transmitted data objects. The receiving station may utilize the object properties at recording time or store the object properties for later use when playing back the program.

One embodiment comprises a method for recording a program which includes a plurality of data objects. A stream of data which is part of a program is broadcast to a receiving station. The data stream includes one or more of the data objects. The program may reference data objects which have previously been cached by the receiving station. The program may also reference live data objects which are intended for immediate consumption and become obsolete thereafter. The data stream may include a file table corresponding to the data objects of the program, as well as object properties corresponding to the data objects. When the data stream is received by the receiving station, it is parsed into the individual data objects. The data objects, any accompanying object properties and the file table are then stored as files on a storage device. Some data objects which are external to the program (e.g., data objects from other carousels) are retrieved and are also stored. Live data objects are not stored, but references to these data objects are stored, so that when the program is replayed, current versions of the referenced live data objects can be used.

BRIEF DESCRIPTION OF THE DRAWINGS

Other objects and advantages of the invention will become apparent upon reading the following detailed description and upon reference to the accompanying drawings in which.

Figure 1:
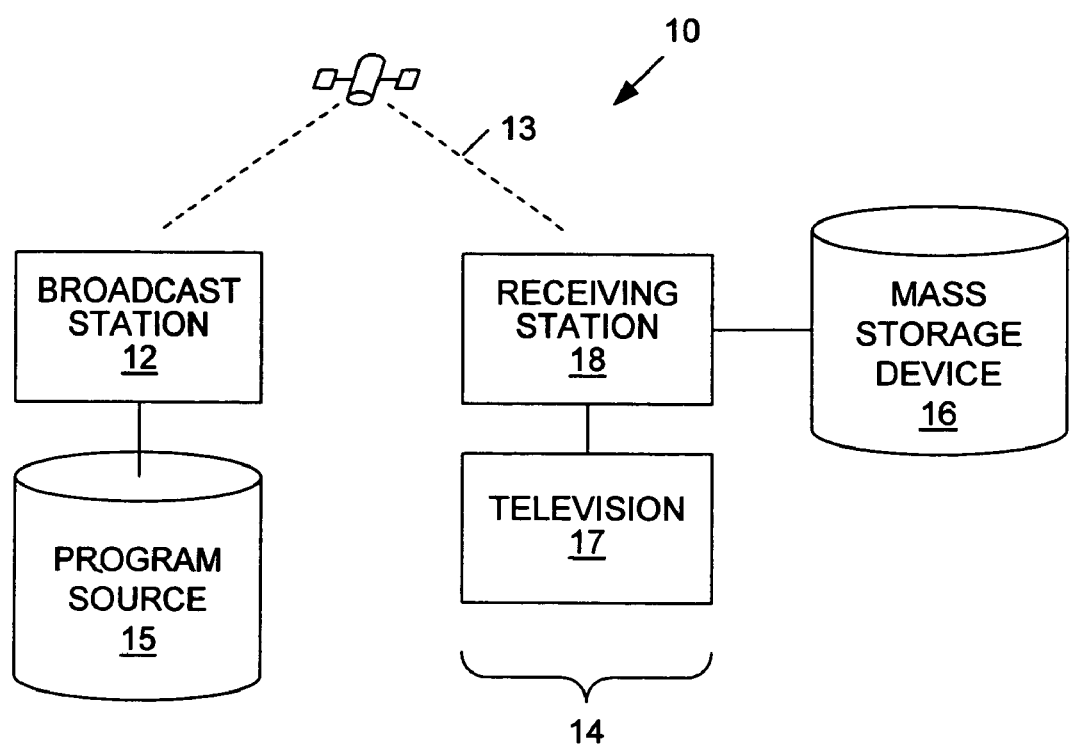
FIG. 1 is a functional block diagram of an interactive television system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Broadly speaking, the invention comprises an improved system and method for storing pushed data content, wherein the data is stored as a set of files rather than as a data stream. While many embodiments of the invention are possible, and the system and method presented herein are equally applicable to the storage of programs in other pushed-data systems, the following description focuses primarily on one embodiment which is implemented in an interactive television system. This description is intended to be illustrative rather than limiting.

Referring to FIG. 1, a functional block diagram of an interactive television system 10 is shown. Interactive television system 10 generally comprises a broadcast station 12 and a receiving station 14 coupled to the broadcast station by a broadcast medium 13. In this figure, broadcast medium 13 is depicted as a satellite transmission network. The broadcast medium may, in other embodiments, comprise other transmission means such as cable, telco, MMDS (microwave) and terrestrial transmission media. Broadcast station 12 is coupled to a program source 15 which is configured to provide the data objects which form the data stream of a program. Receiving station 14 includes a receiver 18 which is coupled to a storage device 16. Storage device 16 is configured to store the data objects. Receiving station 14 also includes a television 17 which is used to present the program to a user.

In one embodiment, the data objects of a program data stream which is to be broadcast from broadcast station 12 to receiving station 14 are stored in program source 15. The data objects are stored separately (e.g., as independently accessible files.) Each of the data objects is retrieved by broadcast station 12 from program source 15 and converted to a format suitable for transmission over broadcast medium 13. It should be noted that the program may also contain streams of data (e.g., audio and video) which are not transmitted as data objects. In this particular embodiment, the data is formatted into packets which can be transmitted over a digital satellite network. These packets may be multiplexed with other packets for transmission.

Broadcast station 12 transmits the data objects of the program cyclically as a carousel to receiving station 14. This produces a stream of data in which each data object is transmitted repeatedly. It should be noted that the broadcast medium (a digital satellite network in this embodiment) can support a number of different channels, and that different carousels (and corresponding data streams) can be concurrently broadcast on these channels. When receiving station 14 receives the data stream, the program contained in the data stream may be played immediately or it may be recorded. In either case, receiving station 14 converts the data stream back into the data objects. If the program is to be played immediately, the data objects are used as necessary in the program. If the program is to be stored, the data objects are stored as a set of files on storage device 16. Other data streams which are included in the program (e.g., audio or video streams) may also be stored on storage device 16. The program may be stored whether it is immediately played or not.

Receiver 18 is typically implemented in a set-top box which is connected to television 17. The set-top box incorporates a control unit (e.g., a microprocessor,) a memory, and other components which are necessary to select and decode the received interactive television signals. Because the basic components and features of set-top boxes are known, they will not be discussed in detail here. Typically, set-top boxes are designed to provide the necessary interactive functionality at a minimal cost. Consequently, they normally have a limited amount of memory and no mass storage devices (e.g., hard disk drives.) While the memory is sufficient to execute interactive applications, it is not adequate to store the applications for an indefinite period of time. Therefore, the applications do not normally remain in memory when they are no longer being executed.

Even if the memory of the set-top box were large enough to store some interactive applications, it might still be too small to accommodate a program which includes large amounts of audio or video data, application code, or other information. Storage device 16 is coupled to the set-top box to provide sufficient storage to record programs that will not fit in the limited amount of memory in the set-top box. Storage device 16 may comprise any suitable storage device, such as a hard disk drive, a recordable DVD drive or optical disk drive. It can be internal to the set-top box, or it may be connected externally. Storage device 16 can be connected permanently or removably to the set-top box.

Figure 2:
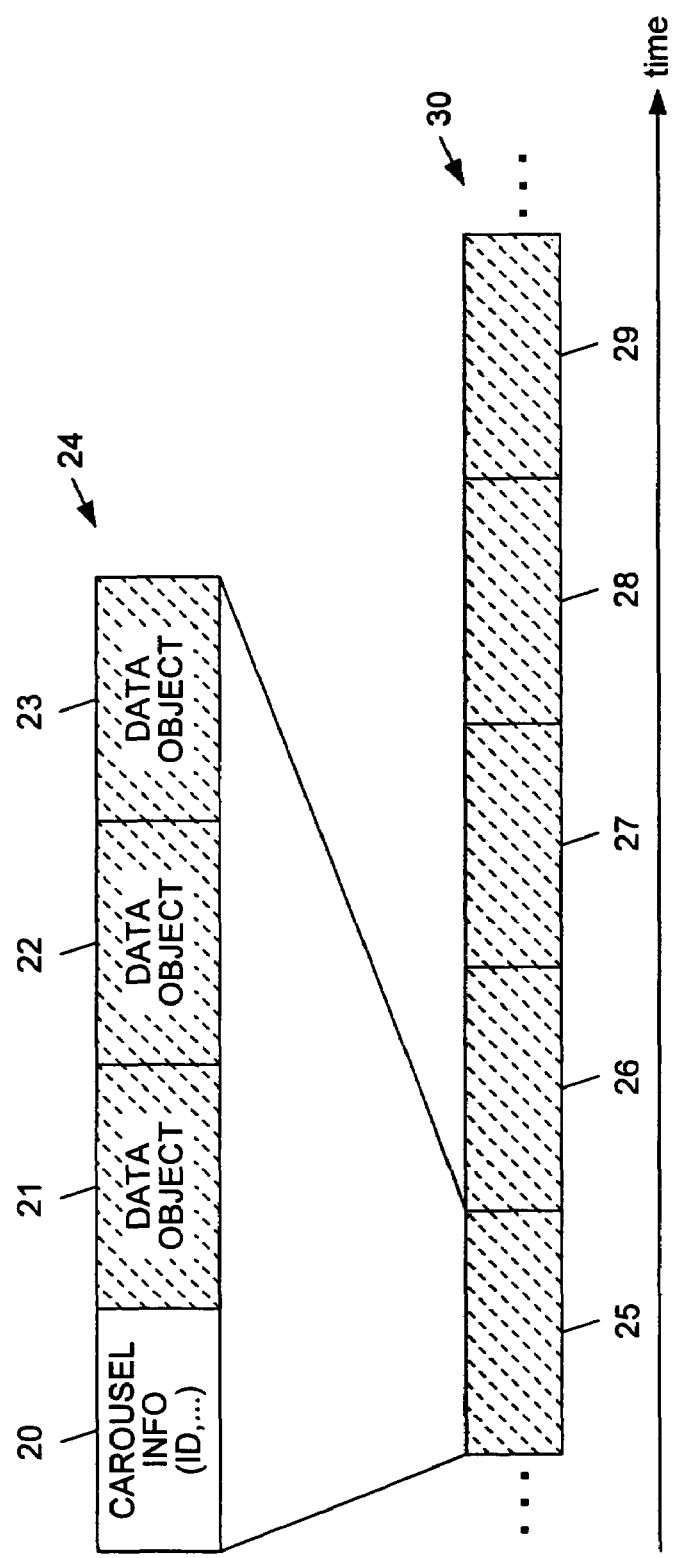
FIG. 2 is a diagram illustrating the structure of a carousel and a corresponding data stream.

Referring to FIG. 2, the structure of a carousel (and a corresponding data stream) which is transmitted to the receiver is illustrated. Carousel 24 comprises data objects 21–23 and carousel information 20. Data objects 21–23 are retrieved from a program source as described above. Carousel information 20 is provided by the broadcast station and may contain information such as the carousel ID and version number, a file table or directory for the carousel, and various other information. (Portions of this information, such as a file table, are not normally found in programs which are intended for immediate consumption.) The broadcast station transmits carousel information 20 and data objects 21–23 sequentially. The first instance of the transmission of carousel 24 is indicated by 25. After the broadcast station has completed transmission of the first instance of carousel 24, it is transmitted again, as indicated by 26. The successive, cyclical transmissions of carousel 24 indicated by 25–29 form data stream 30. Transmission of the carousel may be repeated indefinitely.

The carousel may be provided to the broadcast station as a pre-constructed data stream, or the carousel may be put together "on the fly." Similarly, object properties may be included in a data stream which is provided to the broadcast station, or they may be inserted into the data stream before it is broadcast. For example, version numbers may be inserted to identify that updates have been made to particular data objects, or flags can be inserted to identify particular data objects which need to be cached by the receiver. Object properties inserted in the data stream by the broadcast station can be used by the receiver in storing, replaying, filtering or otherwise utilizing the data objects in the data stream.

As mentioned above, the data objects which comprise a data stream of a program may include application code and data, audio and video clips, control signals, triggers, =raw data and other types of information. If the program is to be immediately consumed (i.e., presented to the user,) the data must be parsed to extract the data objects from the stream. When the necessary data objects have been extracted, the data stream is played. The data objects are then used as defined in the program. For example, any applications which need to be executed are launched, any audio or video data which needs to be presented to the user is played or displayed, any signals which need to be produced are generated, and so on. The program is presented to the user, typically via a television 17, and is consumed. Regardless of whether or not the program is immediately presented to the user, it can also be stored. If the user wishes to record the program, the data objects are extracted in the same manner, but they are stored in mass storage device 16 instead of being immediately used to present the program. The recorded program can then be played back using the stored data objects. To illustrate the advantages of the system and method, it may be useful to examine the structure of a program.

Figure 3:
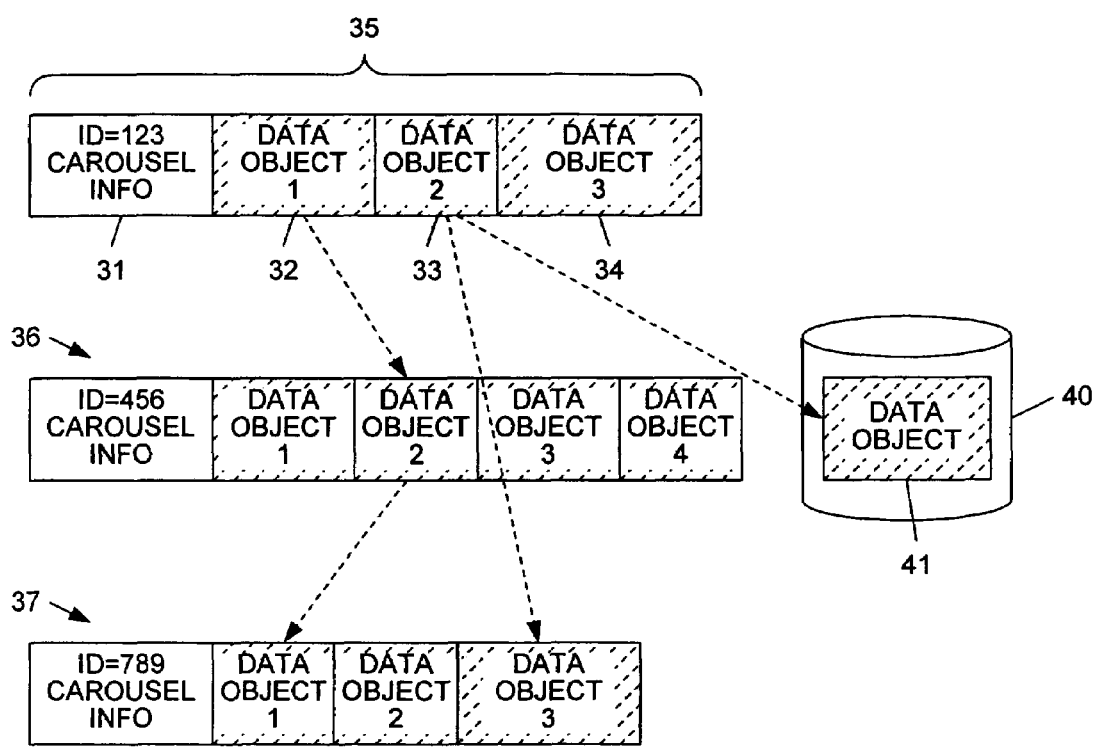
FIG. 3 is a diagram illustrating the interrelation of data objects in one program.

The data objects of a program may contain many different types of data and may be interrelated in various ways. Referring to FIG. 3, an example of the interrelation of data objects in one program is illustrated. (The relationships of the data objects in this particular program are exemplary and other program structures may vary widely.) In the figure, an interactive television program includes carousel 35. Carousel 35 consists of data objects 32–34 and identifying information 31. As mentioned above, data objects 32–34 may include, application code and data, audio and video clips, and other information. The data objects in carousel 35 contain references (indicated by the dashed arrows) to data objects in other carousels 36, 37. In this example, carousel 36 itself contains a reference to a data object in carousel 37. In addition to the references to carousels 36 and 37, carousel 35 contains a reference to a data object 41 that happened to be stored in mass storage device 40 at the time of broadcast of the data stream containing carousel 35. (It should be noted that recorded streams of data can be referenced in the same manner as data objects.)

Each of the programs is typically transmitted from the broadcast station to the receiving station on a different channel. When the program is to be played, the receiving station selects the channel on which the corresponding carousel data stream is being transmitted to receive the corresponding data objects. When the program is played and one of these data objects references a data object in another carousel, the receiving station selects the corresponding channel and obtains the necessary data objects. Likewise, when one of the data objects references a data object which happened to be stored in mass storage device 40 (which is coupled to the receiving station,) that device is accessed to retrieve the data object. The receiving station is thereby able to access the necessary data objects from the data streams of the different carousels and to play the complete program.

As indicated above, the mass storage device can be used to store programs "as is" (i.e., as the received data stream.) One of the disadvantages of storing the data objects of a program as a data stream is that, when the program is to be replayed, the data stream must be played back and the set-top box must again parse the data stream into the data objects which form the program. This playing back of the data stream and re-parsing requires the set-top box's processing resources to be used to repeat work which may have already been done (if the program has already been played.) These resources could otherwise have been used on another task. Another disadvantage is that, when the program is played back, some of the information in the program may be obsolete. For example, if the program is related to investing, it may have been designed to provide the user with current stock quotes. Because the data stream is only as current as the time it was recorded, the stock quotes may be out of date. If the program contains obsolete information, the information may not be useful, and it may even be misleading. Yet another disadvantage is that, when cyclically broadcast data is stored as a stream, several instances of a single data object may be stored when only a single instance is necessary.

The mass storage device can also be used to record the data objects of a program in a file format. In other words, the individual data objects which form the program may be stored as files that can be individually accessed or updated. To illustrate the advantages of recording a program in this manner, it may be useful to examine the structure of a program.

If a user wishes to record a program, it may be stored as a stream of data, or as a set of files. If the receiving station is configured simply to store a particular stream of data, data objects which would normally have been retrieved from other current data streams may not be available. Likewise, data objects which may need to have been cached in a mass storage device may not remain in that device, or may not have been cached at all. If the receiving station is configured to store the program as a set of files, however, the necessary data objects can be identified, retrieved and stored in the set of files. Further, live data objects can be replaced with references to these objects, so that current live data can be retrieved whenever the program is played back.

Figure 4:
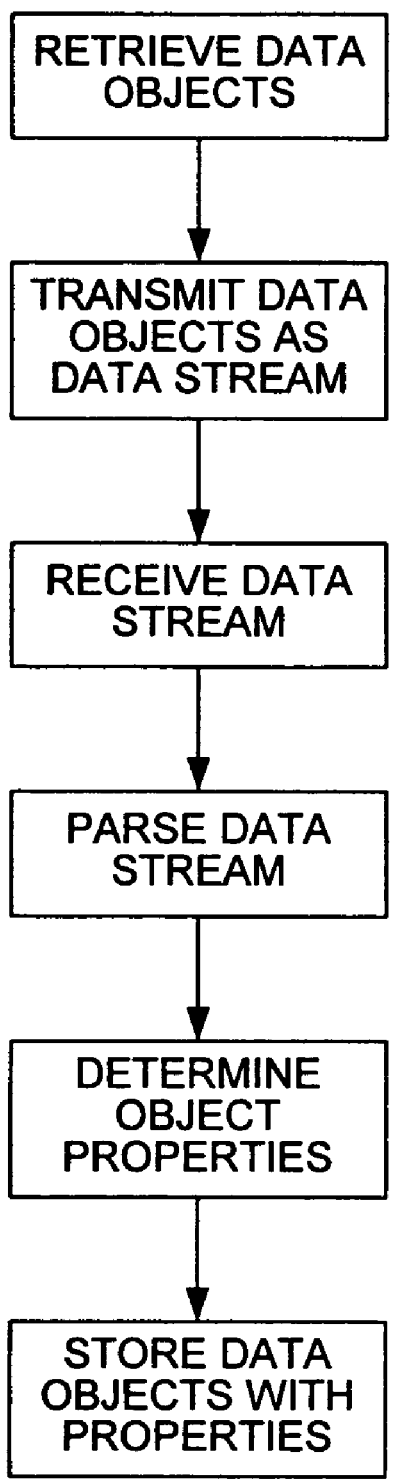
FIG. 4 is a flow diagram illustrating one embodiment of the present method.

Referring to FIG. 4, the method employed by the interactive television system described above is illustrated. The data objects are retrieved by the broadcast station from the appropriate data sources. The carousels are generated from the data objects and are transmitted to the receiving stations in the normal manner. As the data is received, however, it is parsed into the individual data objects of the carousel(s) as if the program were going to be immediately consumed. The receiving station determines the properties associated with the respective data objects and then stores the data objects as files rather than as a stream of data.

In effect, the system converts the pushed data transmitted by the broadcast station to pulled data (i.e., data that can be retrieved at the request of the user.) The files containing the data objects include properties associated with the data objects, such as identifiers, validity ranges, lists of references, and the like. A file table is also stored to enable the files to be accessed on demand. It should be noted that the file table and other properties may not be needed for immediate consumption of the program and might not be transmitted in an interactive television system.

As indicated above, the data objects may include "live" data which becomes obsolete if not consumed immediately. If this data is stored and used when the program is played back, the program will, to that extent, be obsolete. Therefore, while most of the data objects are stored as files, live data objects are stored only as references in the program. In other words, the live data itself is not stored, but an indication of the data (e.g., its length and where it can be found) is stored. Then, when the program is played back, new live data corresponding to the reference will be obtained and used in place of the data which was live at the time the program was recorded. The program is thereby automatically updated when it is replayed.

Figure 5:
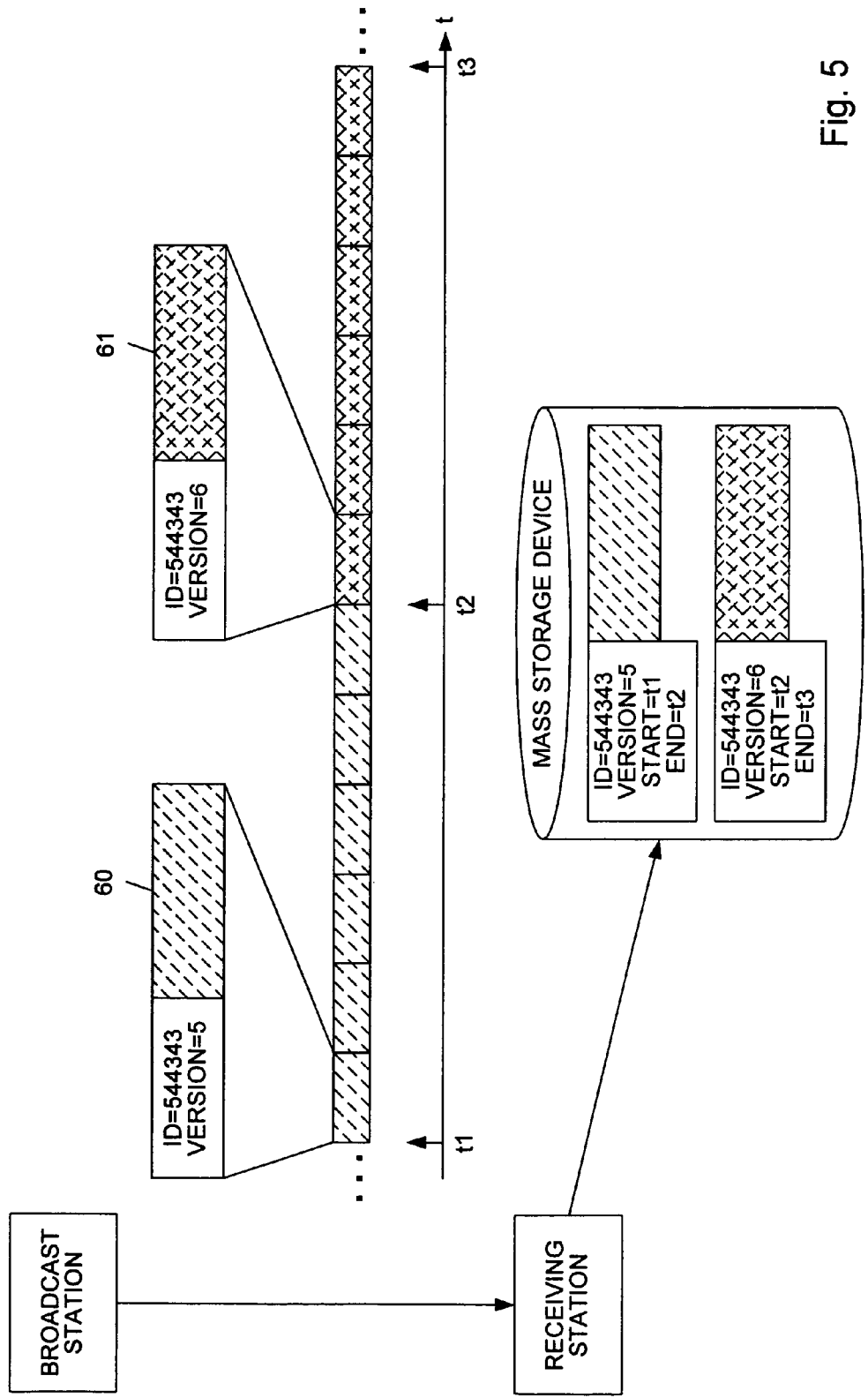
FIG. 5 is a diagram illustrating the storage of a carousel data object and its properties in one embodiment.

In one embodiment, the system is configured to store file identifiers, version numbers and validity ranges for corresponding data objects with their respective files on the mass storage device. Referring to FIG. 5, the storage of the data objects and corresponding object properties is illustrated. Carousel 60 is transmitted from the broadcast station to the receiving station on one channel. Carousel 60 is transmitted with an identifier (id) and a version number. The transmission of this carousel begins at time t1 and is repeated until time t2. At time t2, a new version of the carousel, indicated by reference numeral 61, becomes available and is transmitted in place of the earlier version. Transmission of carousel 61 is repeated until time t3.

The data stream received by the receiving station consists of several sequential transmissions of carousel 60, followed by several sequential transmissions of carousel 61. The receiving station begins parsing the data stream and obtains the data objects which comprise carousel 60. These data objects are stored as files on the mass storage device. (For simplicity, the carousel is depicted here as a single file, but it should be noted that the individual data objects which form the carousel may be stored as separate files. It should also be noted that the carousel itself has properties and can be considered as a data object.) When the receiving station receives the portion of the data stream containing the newer version of the carousel, it detects the new version and extracts the new version of the carousel from the data stream. The new version of the carousel is then stored in the mass storage device. (If only particular data objects within the carousel are newer versions, some embodiments may store only the new data objects rather than the entire carousel.)

In one embodiment, the receiving station is configured to detect the times at which transmission of each carousel begins and ends. In other embodiments, the beginning and ending times may be explicitly transmitted with each carousel. The beginning and ending times define a temporal validity range corresponding to the carousel. Within this validity range, the carousel is available (i.e., valid.) Outside this range, the carousel is unavailable (i.e., invalid.) In one embodiment, the validity range is defined in terms of the time from the beginning of the recording. This information will be useful in the playback of programs which use the carousels or their data objects, as will be explained in more detail below. It should be noted that some data objects, such as signals or triggers, are instantaneous and are considered to have the same beginning and ending times. Although they do not have a range of validity as described above, strictly speaking, they may nevertheless be valid. The temporal validity range of each data object is stored with the other object properties associated with the respective data object.

In one embodiment, the data stream to be stored includes references to data objects which are part of carousels that are carried in other data streams (possibly belonging to other programs on other channels). If the program is consumed when it is broadcast, these external data objects are easily obtained simply by executing the program and, when the reference to the external data object is encountered, selecting the channel on which the data object is being broadcast and obtaining the data object from the corresponding data stream. When the program is recorded from its corresponding data stream to be played back at a later time, obtaining the external data object is not so simple. The system must therefore be configured to detect references to data objects which are external to the program's carousel and to automatically select the proper channel and obtain the data object from the data stream on that channel. This is illustrated in FIG. 6.

Figure 6:
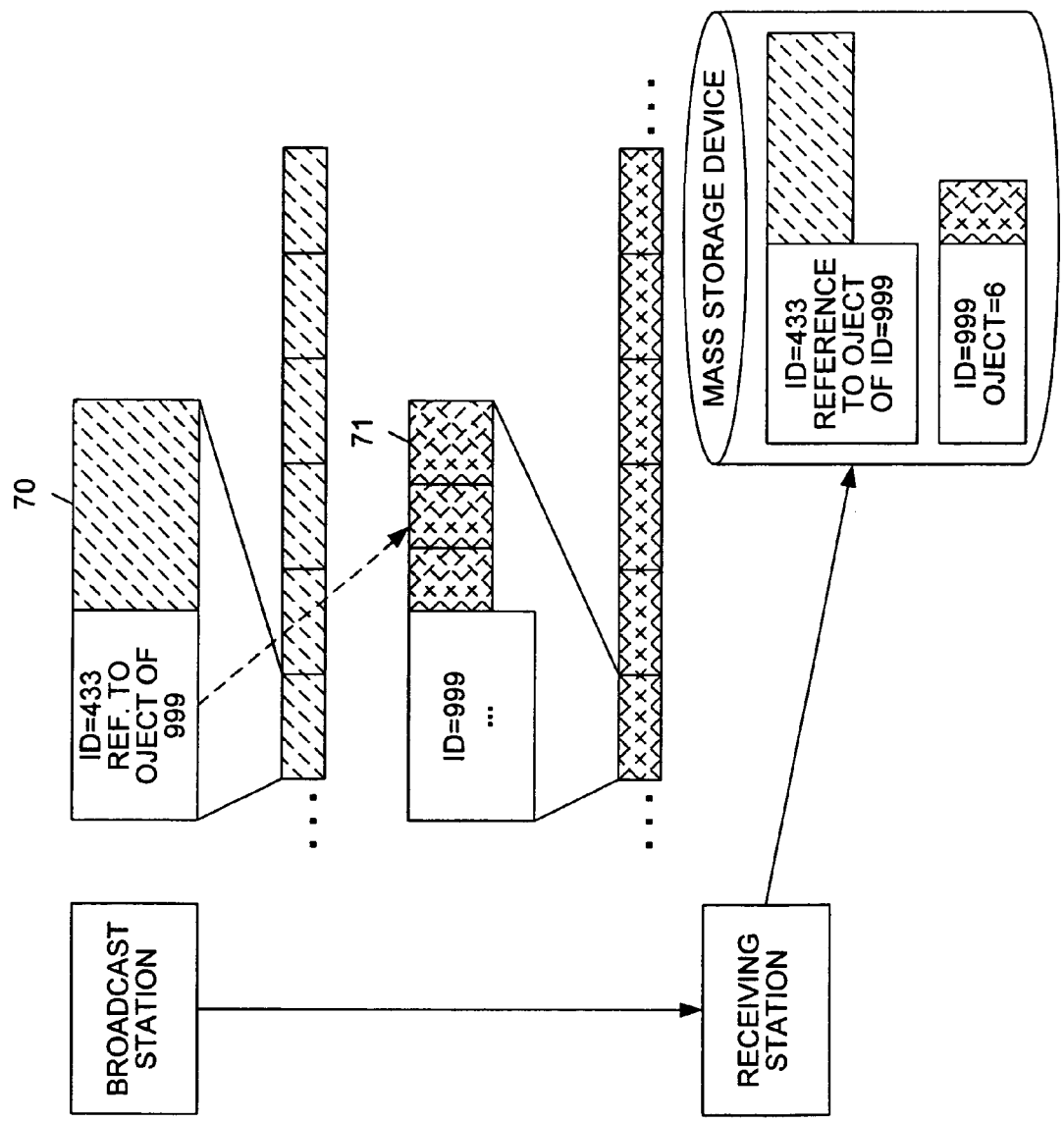
FIG. 6 is a diagram illustrating one embodiment in which references to data objects external to a program carousel are detected and downloaded.

FIG. 6 depicts two carousels 70, 71 which are transmitted from the broadcast station to the receiving station. A first data stream is formed by repeated transmission of carousel 70. The first data stream is transmitted on a first channel. A second data stream is formed by repeated transmission of carousel 71 and is carried on a second channel. Carousel 70, which contains the data objects of the program to be recorded, references one of the data objects contained in carousel 71 (as indicated by the dashed arrow.) A user initiates recording of the program from the data stream received on the first channel. The receiving station parses the data stream and stores the extracted data objects as files on the mass storage device. When a reference to the external data object contained in carousel 71 is encountered, the receiving station selects the second channel and parses the second data stream to obtain the referenced data object. This data object is also stored as a file on the mass storage device. When the program is replayed from the mass storage device, the data object from carousel 71 can be retrieved from the mass storage device and used in the program.

In one embodiment, the program to be stored includes references to live content. Because live content is obsolete if not consumed immediately, the system does not store the live data object which would have been played if the program had been consumed immediately. The system instead stores a reference to the live data so that, when the recorded program is replayed, current live data is obtained from the referenced location and incorporated into the program.

Figure 7:
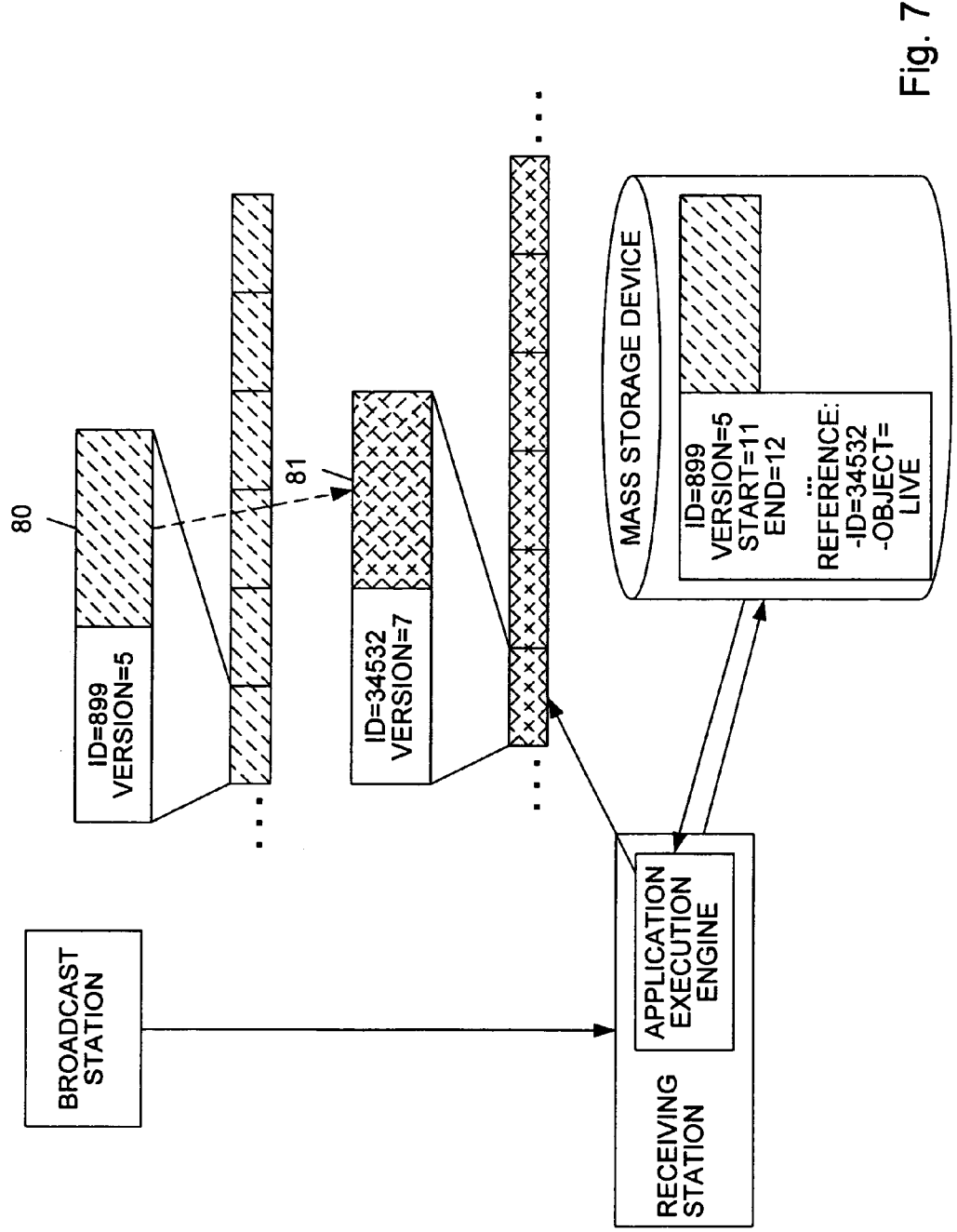
FIG. 7 is a diagram illustrating one embodiment in which a reference to a live data object which is a component of a program is stored instead of the live data object itself.

An example in which live data is referenced is illustrated in FIG. 7. In this figure, a first carousel 80 is depicted as referencing a second carousel 81. Both carousels are transmitted from the broadcast station to the receiving station. The receiving station, however, stores only carousel 80. Carousel 81 is not stored, but is listed in the properties associated with carousel 80 as a live reference. When the program of carousel 80 is replayed by the application execution engine of the receiving station, the reference provides an indication that current live content should be obtained from the location indicated in the reference. Thus, even though the program is replayed at a time when the original live data would be obsolete, current information is incorporated into the program.

In one embodiment, the program to be stored includes references to previously cached data. Some information may not be broadcast as part of a carousel, but may still need to be incorporated into a program. This information can be flagged so that, when it is broadcast, the flag wil be detected and the information will be stored on the mass storage device of the receiver, regardless of whether or not the corresponding data stream is currently being recorded. Later, when a program that references the cached information is played, the information can be retrieved from the mass storage device. This may be useful when, for example, the amount of cached information is so large that including it in the carousel would reduce the frequency with which the data objects are broadcast to a lower rate than desired. In this situation, the cached information could be broadcast once at the beginning of a program, stored and then referenced as necessary during the program.

Figure 8:
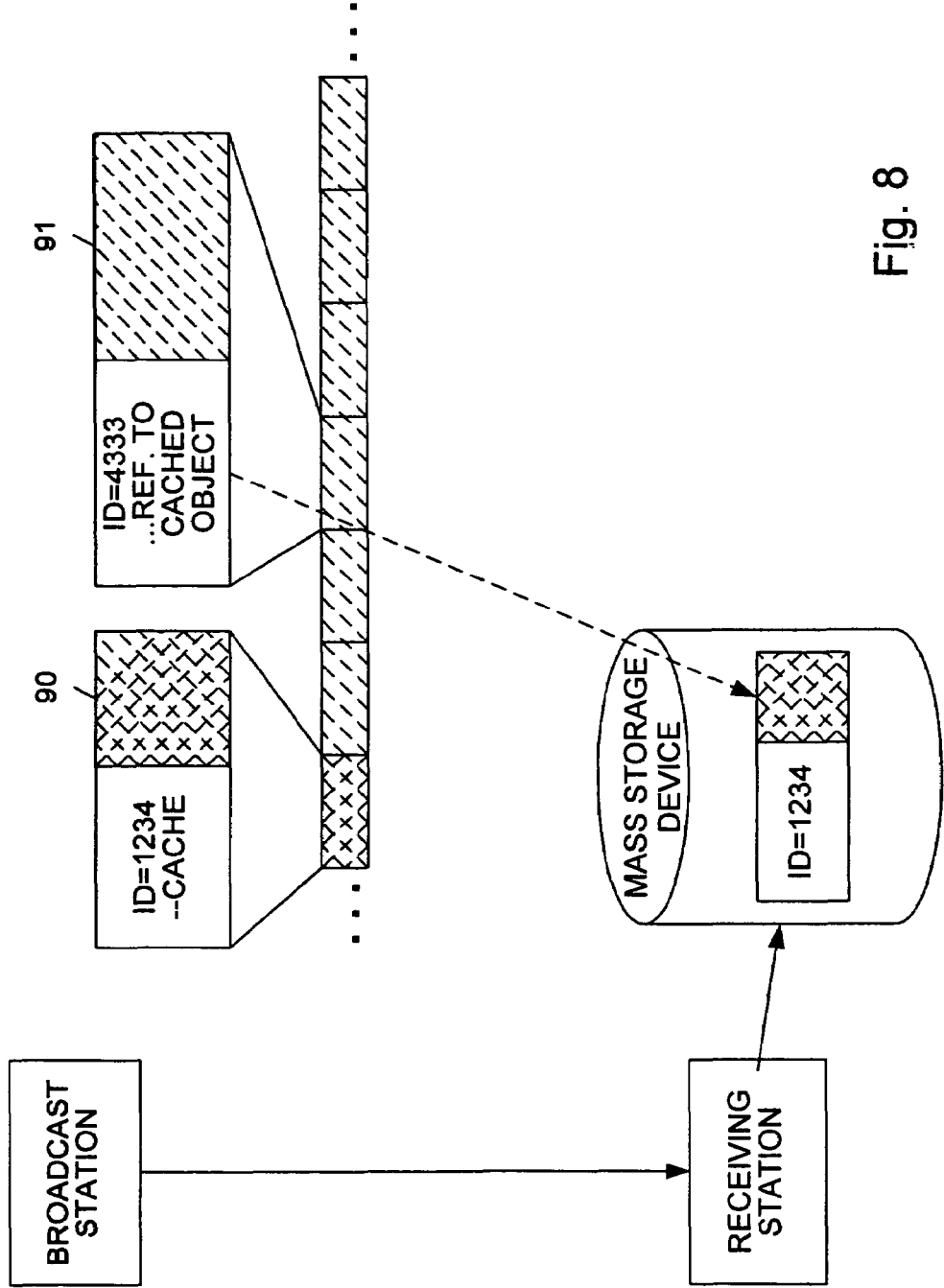
FIG. 8 is a diagram illustrating the caching of a data object prior to downloading a program which references the cached data object.

Referring to FIG. 8, a system which caches information for later use by a program is illustrated. FIG. 8 depicts a data stream in which information 90 is broadcast once, then carousel 91 is cyclically broadcast. (It should be noted that information 90 need not be part of the same data stream as carousel 91 and may be broadcast on a separate channel.) As the receiving station receives the data stream, information 90 is detected. Information 90 includes a flag which indicates that the information should be cached on the receiving station's mass storage device. The receiving station therefore stores information 90. At some time after information 90 has been stored, carousel 91 is received. When the program embodied in this carousel is played, information 90 can be immediately retrieved from the cache when a reference to the information is encountered in the program. (Although the cached data is shown in the figure as being stored in the mass storage device, it could also be stored in a smaller cache memory.)

It should be noted that this feature can be utilized whether the program is consumed upon receipt of the data stream or recorded for playback at later time. If the program is stored for later playback, the cached data is retained in memory so that it can be accessed during playback. The cached data can be stored in the mass storage device or in a smaller cache memory. If the data is stored in a small cache memory, it may need to be copied to the mass storage device upon detection of the reference to the data in the recorded program. Otherwise, the data might be overwritten in the cache before the program is played back.

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. A method implemented in an interactive television system for storage of a pushed program including live data objects, said method comprising:
   receiving a first pushed signal, wherein said first pushed signal includes a program;
   parsing at least a portion of the first pushed signal to extract one or more data objects;
   in response to detecting said program is to be presented immediately:
     utilizing a first set of said data objects corresponding to said program in order to present said program immediately, said first set of data objects including non-live data objects and one or more live data objects;
   in response to detecting said program is to be stored for deferred playback:
     storing first data objects of said first set on a mass storage device, in response to detecting said first data objects are non-live data objects; and
     storing a reference to a second data object of said first set on said mass storage device, in response to detecting said second data object is a live data object.

2. The method of claim 1, further comprising:
   in response to detecting said program is stored on said mass storage device and playback of the program has been requested:
     retrieving said first data objects from said mass storage device;
     retrieving said reference from said mass storage device;

utilizing said reference to retrieve a third data object which corresponds to said second data object; and presenting said retrieved first data objects and said third data object.

3. The method of claim 2, wherein said third data object is retrieved from a second pushed signal.

4. The method of claim 2, wherein said utilizing comprises:

generating a request for said third data object from a remote location; and receiving said third data object in response to said request.

5. The method of claim 1, further comprising:

receiving a second pushed signal;

in response to detecting the data objects corresponding to the first pushed signal reference one or more data objects corresponding to the second pushed signal, extracting said one or more of said data objects from said second pushed signal; and storing said one or more of said data objects from the second pushed signal on said mass storage device.

6. The method of claim 1, further comprising receiving properties associated with the data objects corresponding to the first pushed signal, wherein one or more of said properties are selected from the group consisting of: one or more validity ranges; one or more data object identifiers; one or more version identifiers; and one or more references to a data object.

7. The method of claim 1, further comprising:

detecting a cacheable data object of said one or more data objects corresponds to a program not included in said first pushed signal;

caching said cacheable data object;

subsequently receiving and presenting the program corresponding to the cacheable data object;

accessing said cached data object; and presenting said cacheable data object as part of said program corresponding to the cacheable data object.

8. The method of claim 1, further comprising storing a file table with said first data objects.

9. The method of claim 1, wherein said first data objects are stored in a first file, and wherein object properties of said first data objects are stored in a second file.

10. The method of claim 1, further comprising:

detecting a reference in said first pushed signal to an external data object, wherein said external data object is contained in a third pushed signal;

selecting the third pushed signal;

extracting said external data object from the third pushed signal; and storing said external data object.

11. The method of claim 1, wherein said reference to said second data object is stored as an object property on said storage device.

12. A system comprising:

an interactive television receiver configured to receive a first pushed signal, wherein said first pushed signal includes a program, and parse at least a portion of the first pushed signal to extract one or more data objects;

a storage device coupled to said interactive television receiver;

wherein in response to detecting said program is to be presented immediately, said receiver is configured to utilize a first set of said data objects corresponding to said program in order to present said program immediately, said first set of data objects including non-live data objects and one or more live data objects; and wherein in response to detecting said program is to be stored for deferred playback, said receiver is configured to store first data objects of said first set on said storage device in response to detecting said first data objects are non-live data objects, and store a reference to a second data object of said first set on said mass storage device in response to detecting said second data object is a live data object.

13. The system of claim 12, wherein in response to detecting said program is stored on said storage device and playback of the program has been requested, said receiver is configured to:

retrieve said first data objects from said mass storage device;

retrieve said reference from said mass storage device;

utilize said reference to retrieve a third data object which corresponds to said second data object; and present said retrieved first data objects and said third data object.

14. The system of claim 13, further comprising a display device configured for presentation of said program.

15. The system of claim 12, wherein said receiver is configured to:

receive a second pushed signal;

detect said third data object in said second pushed signal; and retrieve said third data object from said second pushed signal.

16. The system of claim 12, wherein said receiver is further configured to:

generate a request for said third data object from a remote location; and receive said third data object in response to said request.

17. The system of claim 12, wherein said receiver is further configured to:

receive a second pushed data stream; and in response to detecting the data objects corresponding to the first pushed signal reference one or more data objects corresponding to the second pushed signal, extract said one or more of said data objects from said second pushed signal, and store said one or more of said data objects from the second pushed signal on said mass storage device.

18. The system of claim 12, wherein said receiver is further configured to receive properties associated with the data objects corresponding to the first pushed signal, wherein one or more of said properties are selected from the group consisting of: one or more validity ranges; one or more data object identifiers; one or more version identifiers; and one or more references to a data object.

19. The system of claim 12, further comprising a broadcast station coupled to said interactive television receiver, wherein said broadcast station is configured to transmit said pushed signal to said interactive television receiver.

20. The system of claim 12, wherein said receiver is further configured to:

detect a cacheable data object of said one or more data objects corresponds to a program not included in said first pushed data stream;

cache said cacheable data object;

subsequently receive and present the program corresponding to the cacheable data object;

access said cached data object; and present said cacheable data object as part of said program corresponding to the cacheable data object.

21. A method implemented in an interactive television system, said method comprising:

receiving a pushed signal, wherein said pushed signal includes a program;

parsing at least a portion of the pushed signal to extract one or more data objects;

in response to detecting said program is to be stored for deferred playback:

storing a first data object of said one or more data objects on a mass storage device, in response to detecting said first data object is a non-live data object; and storing a reference to a second data object of said one or more data objects on said mass storage device, in response to detecting said second data object is a live data object.

22. A system comprising:

an interactive television receiver configured to receive a first pushed signal, wherein said pushed signal includes a program; and a storage device coupled to the interactive television receiver;

wherein the interactive television receiver is configured to parse at least a portion of the first pushed signal to extract one or more data objects;

wherein in response to detecting said program is to be stored for deferred playback, the interactive television receiver is configured to:

store a first data object of said one or more data objects on said storage device in response to detecting said first data object is a non-live data object; and store a reference to a second data object of said one or more data objects on said mass storage device in response to detecting said second data object is a live data object.

* * * * *